United States Patent [19]
Morimoto

[11] Patent Number: 5,812,139
[45] Date of Patent: Sep. 22, 1998

[54] METHOD AND APPARATUS FOR GRAPHIC PROCESSING INCLUDING ANTI-ALIASING AND FLICKER REMOVAL

[75] Inventor: Akihiro Morimoto, Yokohama, Japan

[73] Assignee: Matsushita Electric Industrial Co., Ltd., Osaka, Japan

[21] Appl. No.: 456,480

[22] Filed: Jun. 1, 1995

[30] Foreign Application Priority Data

Jun. 7, 1994 [JP] Japan ................................. 6-125329

[51] Int. Cl.⁶ ................................................. G06T 5/00
[52] U.S. Cl. .................... 345/428; 345/136; 345/441; 382/266
[58] Field of Search ...................... 395/118, 128, 395/164, 143; 345/136, 418, 428, 441–3; 382/190, 199, 260–1, 266–9

[56] References Cited

U.S. PATENT DOCUMENTS

| | | | |
|---|---|---|---|
| 5,022,091 | 6/1991 | Carlson | 382/240 |
| 5,050,984 | 9/1991 | Geshwind | 352/38 |
| 5,361,386 | 11/1994 | Watkins et al. | 345/429 |
| 5,365,251 | 11/1994 | Denber | 345/136 |
| 5,384,912 | 1/1995 | Ogrinc et al. | 395/164 |
| 5,469,188 | 11/1995 | Krishnamuethy et al. | 345/117 |
| 5,548,698 | 8/1996 | Poppenga et al. | 395/109 |

FOREIGN PATENT DOCUMENTS 61-223888A 10/1986 Japan .
63-199594A 8/1988 Japan .

OTHER PUBLICATIONS

Foley, James D., et al, "Computer Graphics: Principles and Practices", *Addison–Wesley Publishing Co.*, 2nd ed. pp. 617–645, 1990.

*Primary Examiner*—Rudolph J. Buchel, Jr.
*Attorney, Agent, or Firm*—Watson Cole Stevens Davis, P.L.L.C.

[57] ABSTRACT

In order to reduce the amount of computation processing and simplify processing, a graphic processor apparatus includes a graphic signal generator circuit for generating video images such as graphics and characters, and a filter processor circuit for conducting filter processing on video images outputted from said graphic signal generator circuit. Anti-alias processing for reducing jaggy phenomena and flicker removing processing are simultaneously conducted in the filter processor circuit.

2 Claims, 3 Drawing Sheets

METHOD AND APPARATUS FOR GRAPHIC PROCESSING INCLUDING ANTI-ALIASING AND FLICKER REMOVAL

BACKGROUND OF THE INVENTION

1. Field of the Invention

The present invention relates to a graphic processing method and a graphic processor apparatus for generating video images such as graphics and characters with reduced jaggy phenomena and flicker.

2. Description of the Related Art

In the field of computer graphics (CG), a technique called anti-alias is used when video images are displayed on a display device functioning as the output media of computer graphics. This aims at making displayed video images more beautiful. This technique is processing for making jaggy phenomena visually inconspicuous. The jaggy phenomena mean a boundary (edge) has jagged steps as shown in FIG. 1.

As conventional anti-alias processing, supersampling processing is conducted. The supersampling processing includes the steps of resolving each pixel into M×N subpixels having M pixels in the horizontal direction and N pixels in the vertical direction (where M and N are natural numbers), performing pixel value calculations with high resolution, then conducting filter processing of deriving an average or a weighted average of M×N subpixels, and adopting the average or weighted average as the pixel value of each pixel.

Furthermore, in the case where video images such as graphics and characters generated by a graphic processor apparatus are watched on an interlace television monitor of NTSC or the like, the edge portion turns on and off once every 1/30 second and thereby visual flicker impairment occurs. This flicker impairment is perceived as degradation of picture quality. In graphic processor apparatuses, therefore, bandwidth limitation of the spatial frequency in the vertical direction is performed in order to remove flicker.

FIG. 2 is a basic configuration diagram of a graphic processor apparatus capable of performing the above described anti-alias processing and flicker removal. Numeral 10 denotes a graphic signal generator circuit, which generates video images such as graphics and characters having a resolution of subpixel. The graphic signal generator circuit 10 is often formed around a CPU. Numeral 11 denotes a weighted averaging processor circuit, which conducts weighted averaging processing of a plurality of subpixels with respect to video images generated by the graphic signal generator circuit 10. Numeral 12 denotes a subsampling processor circuit, which conducts subsampling processing on video images having the subpixel resolution outputted by the weighted averaging processor circuit 11. Numeral 13 denotes a flicker removing processor circuit, which conducts flicker removal on video images outputted by the subsampling processor circuit 12. Numeral 14 denotes an output end, which outputs video images subjected to flicker removal.

Operation of the conventional apparatus will now be described.

In the case where the number of pixels representing the resolution of the display device is X×Y with xpixels in the horizontal direction and Y pixels in the vertical direction, video images such as graphics and characters having a resolution of M×X×N×Y are generated by the graphic signal generator circuit 10. In the weighted averaging processor circuit 11, weighted averaging processing of M×N subpixels is conducted on the video images having the resolution of M×X×N×Y, and resultant video images having the resolution of M×X×N×Y are outputted therefrom. In the subsampling processor circuit 12, subsampling processing is conducted on video images having the resolution of subpixel subjected to weighted averaging processing. That is to say, subpixels in the horizontal direction are thinned out so as to leave one subpixel out of M subpixels and subpixels in the vertical direction are thinned out so as to leave one subpixel out of N subpixels in order to restore original video images having the resolution of X×Y pixels. At this time, video images having the original resolution of X×Y and already subjected to anti-alias processing are obtained. In the flicker removing processor circuit 13, spatial frequency components in the vertical direction are subjected to bandwidth limitation carried out by low-pass filter processing in order to remove flicker from subsampled video images having the resolution of the display device.

Since high resolution processing of resolving one pixel into M×N subpixels is conducted, however, the above described conventional graphic processor apparatus has problems of increased amounts of computation, processing cost, and processing time. Furthermore, since anti-alias processing and flicker removing processing are conducted, the conventional graphic processor apparatus has a problem of complicated processing.

Since spatial frequency components in the vertical direction are subjected to bandwidth limitation in the flicker removing processor circuit, the conventional graphic processor apparatus has also a problem that even patterns other than edges blur and the resolution of video images is degraded.

SUMMARY OF THE INVENTION

The present invention solves such problems of the conventional apparatus.

A first object of the present invention is to provide an excellent graphic processing method and graphic processor apparatus reduced in amount of computation processing and simplified in processing in order to solve the above described conventional problems.

A second object of the present invention is to provide an excellent graphic processing method and graphic processor apparatus reduced in amount of computation processing and simplified in processing, capable of preventing patterns other than edges from blurring and capable of outputting video images with substantial resolution in order to solve the above described conventional problems.

In accordance with a first aspect of the present invention, anti-alias processing for reducing jaggy phenomena and flicker removing processing are simultaneously conducted in filter processing. This aims at achieving the first object in graphic processing for generating video images such as graphics and characters.

In accordance with a second aspect of the present invention, anti-alias processing for reducing jaggy phenomena and flicker removing processing are simultaneously conducted in filter processing and the filter processing is conducted only on edge portions judged by edge detection processing to be edges. This aims at achieving the second object in graphic processing for generating video images such as graphics and characters.

In accordance with a third aspect of the present invention, anti-alias processing for reducing jaggy phenomena and flicker removing processing are simultaneously conducted in filter processing and the filter processing is conducted with filter characteristics set according to edge information derived by edge detection processing. This aims at achieving the second object in graphic processing for generating video images such as graphics and characters.

According to the first aspect of the present invention, anti-alias processing for reducing jaggy phenomena and flicker removing processing are simultaneously conducted in the same filter processing. Thereby, it becomes possible to reduce the amount of computation processing and simplify the processing.

According to the second aspect of the present invention, anti-alias processing for reducing jaggy phenomena and flicker removing processing are simultaneously conducted in the same filter processing and the filter processing is conducted only on edge portions judged by edge detection processing to be edges. Thereby, it becomes possible to reduce the amount of computation processing and simplify the processing. Furthermore, since patterns other than edges are prevented from blurring, video images having a substantial resolution can be outputted.

According to the third aspect of the present invention, anti-alias processing for reducing jaggy phenomena and flicker removing processing are simultaneously conducted in the same filter processing and the filter processing is conducted with filter characteristics set according to edge information derived by edge detection processing. Thereby, it becomes possible to reduce the amount of computation processing and simplify the processing. Furthermore, since patterns other than edges are prevented from blurring, video images having a substantial resolution can be outputted.

DESCRIPTION OF THE PREFERRED EMBODIMENTS

Embodiments of the present invention will hereafter be described by referring to drawing.

Figure 3:
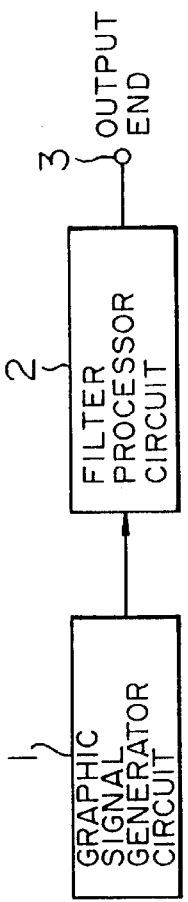
FIG. 3 is a block diagram showing the configuration of a first embodiment of a graphic processing apparatus according to the present invention for implementing a first embodiment of a graphic processing method according to the present invention.

FIG. 3 is a block diagram showing the configuration of a first embodiment of a graphic processing apparatus according to the present invention for implementing a first embodiment of a graphic processing method according to the present invention. Numeral 1 denotes a graphic signal generator circuit, which generates video images such as graphics and characters. The graphic signal generator circuit 1 is formed around a CPU (central processing unit). Numeral 2 denotes a filter processor circuit, which conducts spatial filter processing on video images generated by the graphic signal generator circuit 1. Numeral 3 denotes an output end, which outputs video images subjected to filter processing.

Operation of the first embodiment will now be described.

Figure 1:
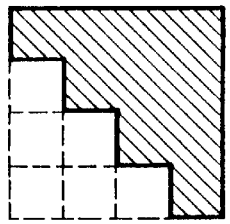
FIG. 1 is a diagram illustrating jaggy phenomena.
Figure 2:
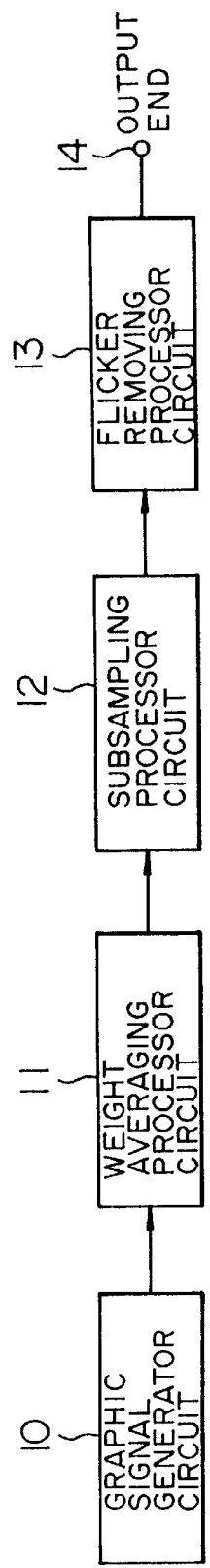
FIG. 2 is a schematic block diagram showing the configuration of a conventional graphic processor apparatus.

Unlike the graphic signal generator circuit 10 of the conventional apparatus shown in FIG. 2, the graphic signal generator circuit 1 does not generate video images such as graphics and characters having a resolution of subpixel, but generates video images such as graphics and characters having a resolution of pixel unit squared with the resolution of the display device. The graphic signal generator circuit 1 of the present embodiment differs from the graphic signal generator circuit 10 of the conventional apparatus only in resolution of generated video images. In the filter processor circuit 2, vertical spatial frequency components and horizontal spatial frequency components are subjected to bandwidth limitation using a low-pass filter. As a result, jaggy phenomena can be reduced and flicker impairment can be removed. By thus conducting anti-alias processing and flicker removing processing simultaneously in filter processing, processing can be simplified.

Figure 4:
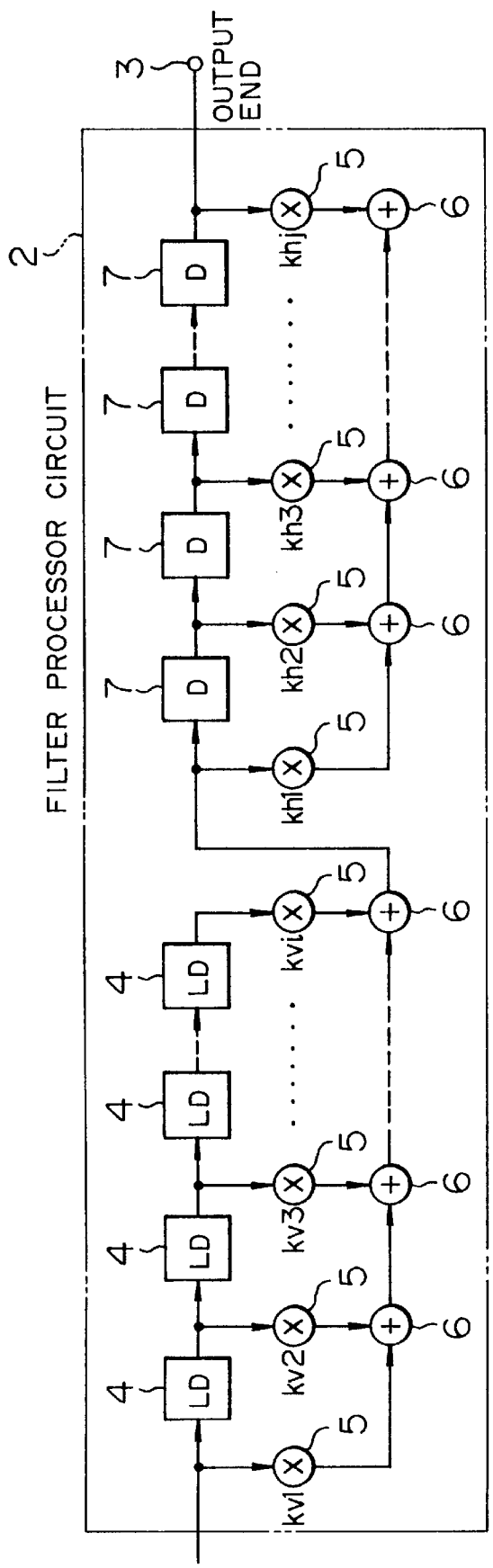
FIG. 4 is a configuration diagram of a filter processor circuit in the first embodiment.

FIG. 4 is a configuration diagram of the above described filter processor circuit 2. In the present embodiment, it is assumed that one-dimensional transversal digital filters which are provided separately for the vertical and horizontal directions and which can be easily configured are used as the filter processor circuit 2.

As shown in FIG. 4, the filter processor circuit 2 includes unity line delay elements (LD) 4, coefficient multipliers 5, adders 6, and unity sample delay elements (D) 7. All of them form the filter processor circuit 2. Among coefficients of the coefficient multipliers, kv1, kv2, . . . , kvi contribute to bandwidth limitation of spatial frequency components in the vertical direction, whereas kh1, kh2, . . . , khj contribute to bandwidth limitation of spatial frequency components in the horizontal direction. These coefficients can be set so as to optimize overall picture quality concerning the anti-alias effect, flicker removal effect and resolution.

In the first embodiment, anti-alias processing and flicker removing processing are conducted simultaneously in filter processing as heretofore described. This eliminates processing of subpixel unit, reduces the amount of computation processing, and simplifies processing.

In the first embodiment, filter processing in the horizontal direction is conducted after filter processing in the vertical direction as the filter processor circuit. Alternatively, filter processing in the vertical direction may be conducted after filter processing in the horizontal direction. In the first embodiment, one-dimensional transversal digital filters provided separately for the vertical and horizontal directions used as the filter processor circuit. Alternatively, a two-dimensional filter may be used.

Figure 5:
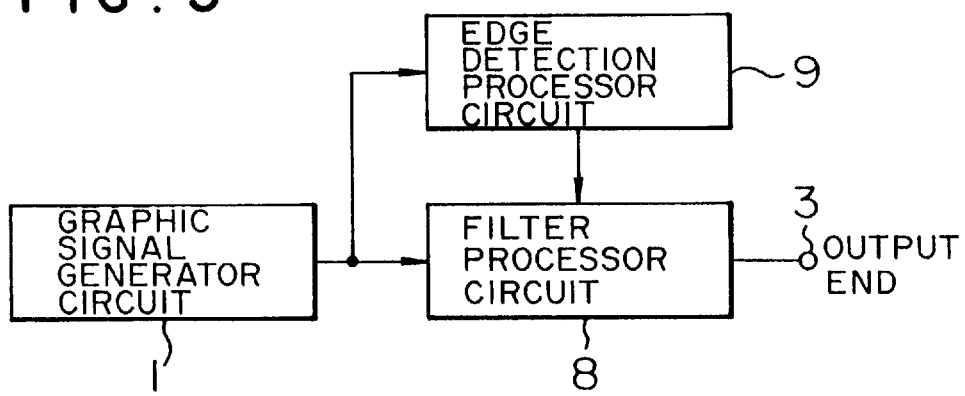
FIG. 5 is a block diagram showing the configuration of a second embodiment of a graphic processing apparatus according to the present invention for implementing a second embodiment of a graphic processing method according to the present invention.

FIG. 5 is a block diagram showing the configuration of a second embodiment of a graphic processing apparatus according to the present invention for implementing a second embodiment of a graphic processing method according to the present invention. Numeral 1 denotes a graphic signal generator circuit, which generates video images such as graphics and characters. The graphic signal generator circuit 1 is formed around a CPU. Numeral 8 denotes a filter processor circuit, which conducts spatial filter processing on video images generated by the graphic signal generator circuit 1. Numeral 9 denotes an edge detection processor circuit, which effects edge detection for each pixel of video images generated by the graphic signal generator circuit 1, generates edge information representing the magnitude of an edge, and outputs the edge information to the filter processor circuit 8. Numeral 3 denotes an output end, which outputs video images subjected to filter processing.

Operation of the second embodiment will now be described.

In the same way as the first embodiment, the graphic signal generator circuit 1 does not generate video images such as graphics and characters having the resolution of subpixel, but generates video images such as graphics and characters having the resolution of pixel unit squared with the resolution of the display device, unlike the graphic signal generator circuit 10 of the conventional graphic processor apparatus shown in FIG. 2. The graphic signal generator circuit 1 of the present embodiment differs from the graphic signal generator circuit 10 of the conventional apparatus only in resolution of generated video images. The edge detection processor circuit 9 conducts threshold processing on the absolute value of Laplacian, i.e., the second differential every pixel and outputs edge information representing the magnitude of an edge to the filter processor circuit 8.

In the filter processor circuit 8, filter characteristics are set according to edge information of each pixel derived from the edge detection processor circuit 9 and vertical spatial frequency components and horizontal spatial frequency components are limited by a low-pass filter. Therefore, jaggy phenomena can be reduced and flicker impairment can be removed. By thus conducting anti-alias processing and flicker removing processing simultaneously in the same processing, processing of the system can be simplified. Since low-pass filter processing is not conducted on the entire image, patterns other than edges can be prevented from blurring and video images having a substantial resolution can be outputted.

Figure 6:
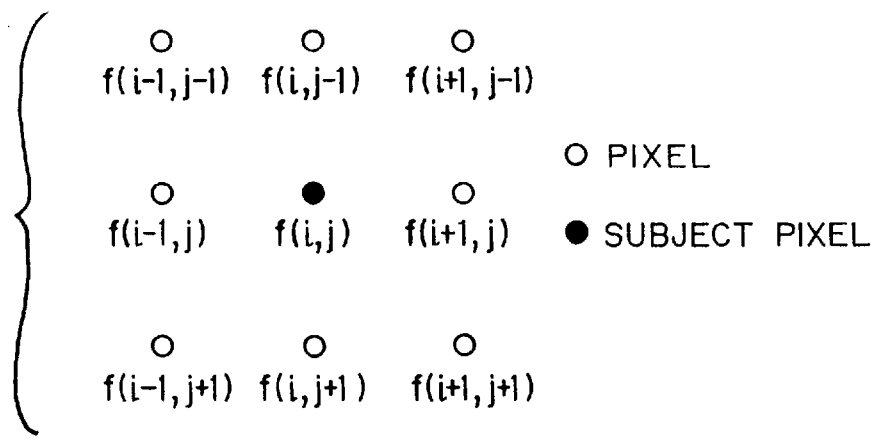
FIG. 6 is a diagram illustrating edge detection in the second embodiment.

By referring to FIG. 6, operation of the edge detection processor circuit 9 will now be described. In the present embodiment, Laplacian which is the second differential is used for edge detection. Assuming a pixel value at a point (i, j) is f(i, j), digital Laplacian $\nabla^2$ can be defined by the following formula.

$$\nabla^2 f(i, j) = f(i+1, j) + f(i-1, j) + f(i, j+1) + f(i, j-1) - 4f(i, j) \quad (1)$$

It is now assumed that three threshold values TH1, TH2 and TH3 are used as the threshold for edge detection and relations $0 \leq TH1 \leq TH2 \leq TH3$ hold true. It is also assumed that edge information obtained by threshold processing for the absolute value of Laplacian is k (k=0, 1, 2, 3). Further supposing that there are no edges when k=0, and the magnitude of an edge is small when k=1, medium when k=2, and great when k=3, relations among absolute values of Laplacian, threshold values, and values of k are given by the following formula.

$$k=0 \text{ when } 0 \leq |\nabla^2 f(i, j)| < TH1$$

$$k=1 \text{ when } TH1 \leq |\nabla^2 f(i, j)| < TH2$$

$$k=2 \text{ when } TH2 \leq |\nabla^2 f(i, j)| < TH3 \quad (2)$$

$$k=3 \text{ when } TH3 \leq |\nabla^2 f(i, j)|$$

By referring to FIG. 7, filter characteristics of the vertical direction and the horizontal direction of the filter processor circuit 8 set according to edge information outputted by the edge detection processor circuit 9 will now be described.

Assuming now that the sampling frequency in the vertical direction is equal to that in the horizontal direction, and the sampling frequency and the Nyquist frequency of the vertical direction and the horizontal direction are fs (Hz) and fn (Hz), respectively, the relation of formula (3) typically holds true between the sampling frequency and the Nyquist frequency.

$$fn = \frac{1}{2} \times fs \quad (3)$$

Figure 7:
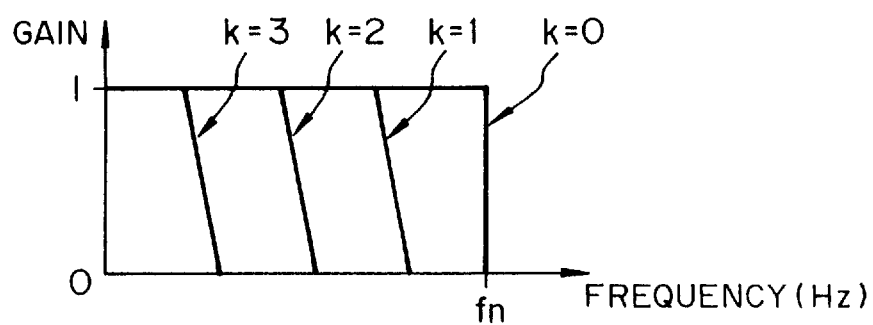
FIG. 7 is a characteristic diagram showing filter characteristics of the vertical direction and horizontal direction in the second embodiment.

FIG. 7 is a characteristic diagram of filter characteristics of the vertical direction and the horizontal direction with edge information k=0, 1, 2 and 3. The abscissa represents the frequency, and the ordinate represents the gain. As the edge information k becomes greater, i.e., the magnitude of the edge becomes greater, the vertical spatial frequency components and the horizontal spatial frequency components are limited in bandwidth. If the filter characteristics of the filter processor circuit 8 are thus set beforehand according to edge information, filter processing according to edge information can be implemented even if conventionally used transversal filters are employed.

The filter processor circuit 8 differs from the filter processor circuit 2 shown in FIG. 4 only in that coefficients kv1, kv2, . . . , kvi and kh1, kh2, . . . , khj of the coefficient multipliers 5 are switched over by edge information of each pixel in the filter processor circuit 8 so as to implement filter characteristics shown in FIG. 7 whereas coefficients of the coefficient multipliers are not switched over for each pixel in the filter processor circuit 2.

While the number of threshold values is three in the second embodiment, it is also possible to make the number of threshold values equal to three and set N+1 filter characteristics.

Especially in the case where N=1, implementing filter characteristics of k=0 and k=1 or k=0 and k=2 or k=0 and k=3 concretely corresponds to conducting filter processing on the edge portion alone.

Furthermore in the second embodiment, the filter characteristic of FIG. 7 in the case where k=0 indicates all-pass filter characteristic. Instead of filter processing of this filter characteristic, however, through processing involving no filter processing may be conducted.

As compared with the method of conducting filter processing on the edge portion alone, the method of conducting filter processing with filter characteristics set according to edge information becomes more complicated in processing. Since multi-step setting of filter characteristics is possible, however, optimization of the overall picture quality concerning the anti-alias effect, flicker removal effect, and resolution is facilitated.

In the second embodiment, the anti-alias processing and flicker removal processing are conducted in the same filter processing as heretofore described. Thereby, processing of subpixel unit is eliminated, and it becomes possible to reduce the amount of computation processing and simplify the processing. Furthermore, since low-pass filter processing is not conducted on the entire video image, patterns other than edges are prevented from blurring and video images having a substantial resolution can be outputted.

In the second embodiment, edge information is calculated every pixel. Alternatively, edge information may be calculated every block of several pixels. Furthermore, in the second embodiment, Laplacian of the second differential is used for edge detection. Instead of this, however, a different detection method such as the first differential, gradient calculation, the Prewitt operator, or the Sobel operator may be used.

While in the second embodiment the filter characteristics of the filter processor circuit 8 of FIG. 7 in the vertical direction is made identical to those in the horizontal direction, separate filter characteristics may be set. Furthermore, while in the second embodiment filter processing in the horizontal direction is conducted after filter processing in the vertical direction as the filter processor circuit 8, filter processing in the vertical direction may be conducted after filter processing in the horizontal direction. While in the second embodiment one-dimensional filters provided separately for the vertical and horizontal directions are used, a two-dimensional filter may be used.

According to the first aspect of the present invention, anti-alias processing for reducing jaggy phenomena and flicker removing processing are simultaneously conducted in the same filter processing in the graphic processing method and graphic processor apparatus. This results in an effect that it becomes possible to reduce the amount of computation processing and simplify the processing.

According to the second aspect of the present invention, anti-alias processing for reducing jaggy phenomena and flicker removing processing are simultaneously conducted in the same filter processing and the filter processing is conducted only on edge portions judged by edge detection processing to be edges. This results in an effect that it becomes possible to reduce the amount of computation processing and simplify the processing, prevent patterns other than edges from blurring, and output video images having a substantial resolution.

According to the third aspect of the present invention, anti-alias processing for reducing jaggy phenomena and flicker removing processing are simultaneously conducted in the same filter processing and the filter processing is conducted with filter characteristics set according to edge information derived by edge detection processing. This results in an effect that it becomes possible to reduce the amount of computation processing and simplify the processing, prevent patterns other than edges from blurring, output video images having a substantial resolution, and facilitate optimization of the overall picture quality.

I claim:

1. A graphic processing method comprising the steps of:

generating images of pixel resolution, conducting anti-alias processing on said images for reducing jaggy phenomena: and conducting flicker removing procession on said images for removing flicker, said flicker removing processing being conducted simultaneously together with said anti-alias processing in the form of filter processing, wherein said filter processing is conducted only on edge portions judged by edge detection processing to be edges and with filter characteristics set according to edge information derived by said edge detection processing.

2. A graphic processing apparatus comprising:

a graphic signal generator circuit for generating video images of pixel resolution such as graphics and characters: and a filter processor circuit for conducting filter processing on said images, said filter processor circuit being capable of simultaneously conducting both anti-alias processing for reducing jaggy phenomena and flicker removing processing for reducing flicker, wherein said filter processor circuit conducts filter processing only on edge portions judged by an edge detection processor circuit to be edges and sets filter characteristics according to edge information derived by said edge detection processor circuit.

\* \* \* \* \*